United States Patent [19]

Van Breen

[11] 4,290,734
[45] Sep. 22, 1981

[54] RIGID DISC HANDLING DEVICE AND METHOD

[75] Inventor: Abraham J. Van Breen, Sunnyvale, Calif.

[73] Assignee: Dysan Corporation, Santa Clara, Calif.

[21] Appl. No.: 150,847

[22] Filed: May 19, 1980

[51] Int. Cl.³ .............................................. B65G 1/12
[52] U.S. Cl. .................................. 414/786; 198/626; 198/801; 414/787
[58] Field of Search .................. 414/27, 267, 331, 786, 414/787; 198/347, 626, 801; 211/1.5; 312/9, 10, 72, 97; 221/221, 222

[56] References Cited

U.S. PATENT DOCUMENTS

| | | | |
|---|---|---|---|
| 3,921,826 | 11/1975 | Rice et al. | 198/801 X |
| 3,977,566 | 8/1976 | Hill | 414/331 X |
| 4,077,528 | 3/1978 | Santen | 198/663 X |

Primary Examiner—Robert G. Sheridan
Attorney, Agent, or Firm—Townsend and Townsend

[57] ABSTRACT

Apparatus and method for stacking rigid magnetic discs so that the discs do not come into contact with one another. A hollow elongate member has at least two elongate axial recesses terminating at openings at each end of the recesses. The outer surface of the elongate member has dimensions slightly less than the inner dimensions of the central apertures of the discs. Endless loops are mounted so that the loops traverse the respective recesses and return within the elongate member. Each loop has a plurality of equally spaced nibs projecting outwardly beyond the outer surface of the elongate member. A drive element is located within the elongate member and is attached to each of the loops. The drive member is moved axially within the elongate member to move the loops in unison and thereby allow serial loading and unloading of the discs on sequential nibs. A sensor system may be included to automatically move the loops to space the discs each time a disc is loaded or unloaded.

15 Claims, 7 Drawing Figures

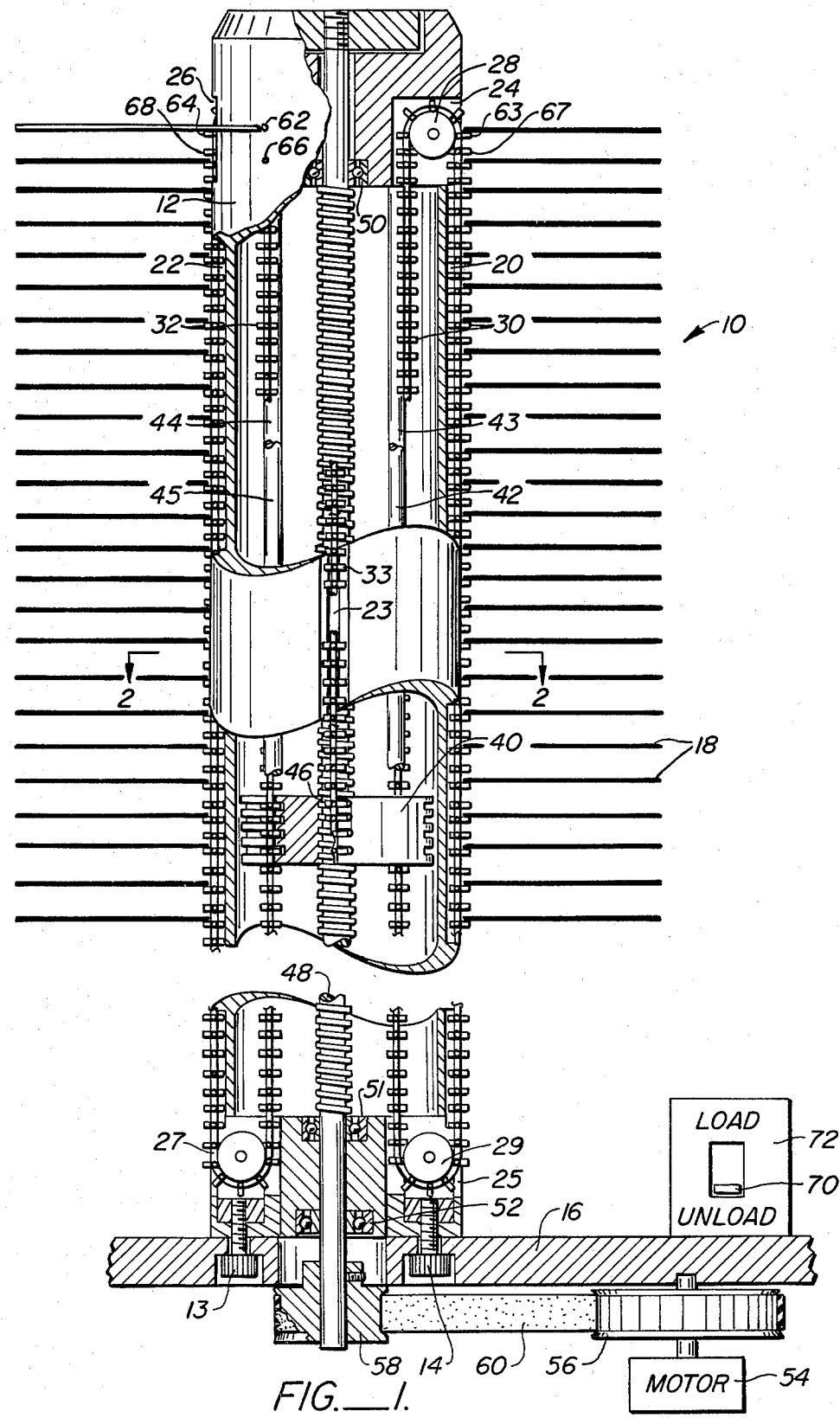
FIG._1.

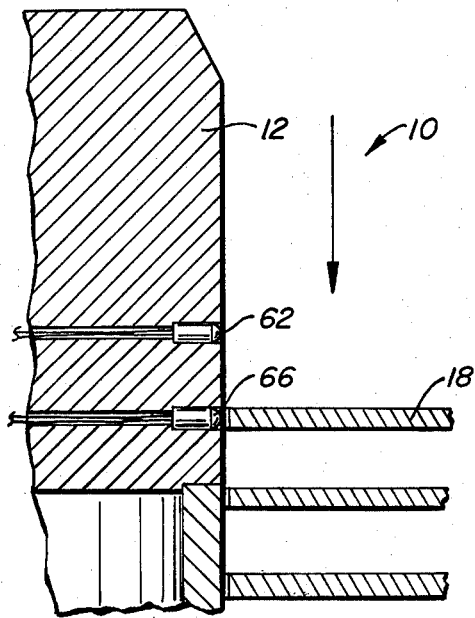
FIG._3A.
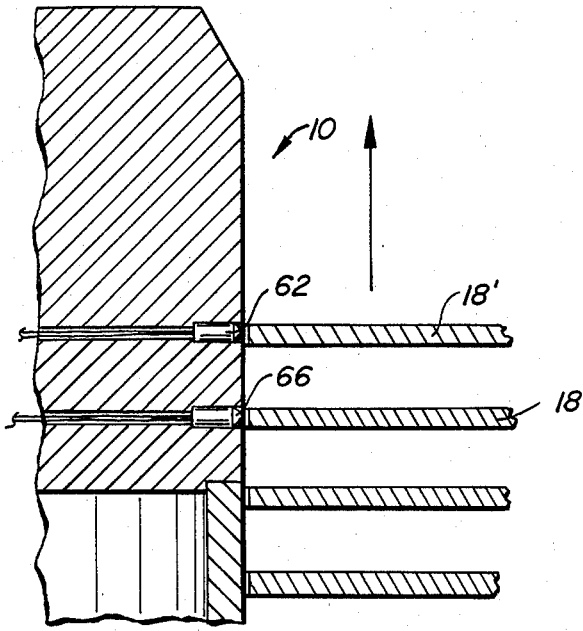
FIG._3B.
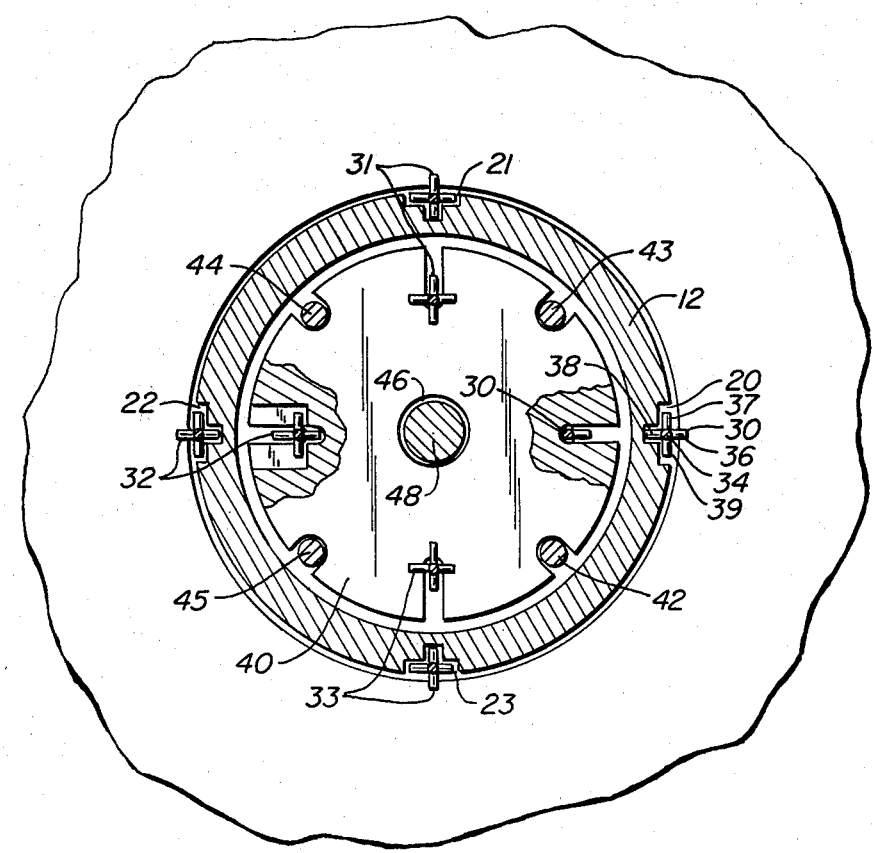
FIG._2.

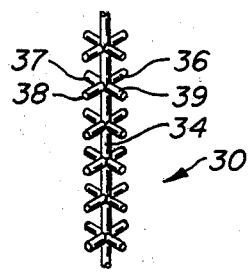
FIG._4.
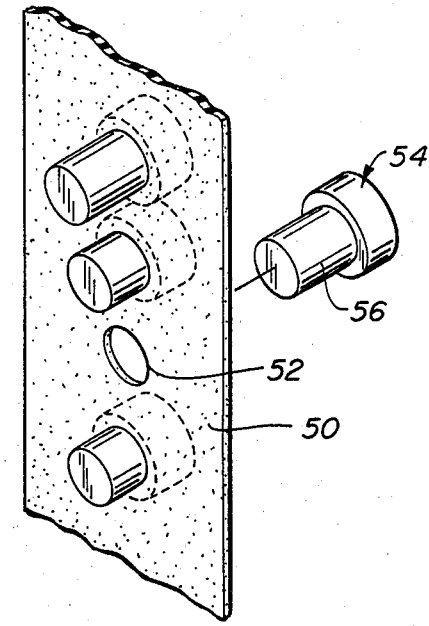
FIG._5.
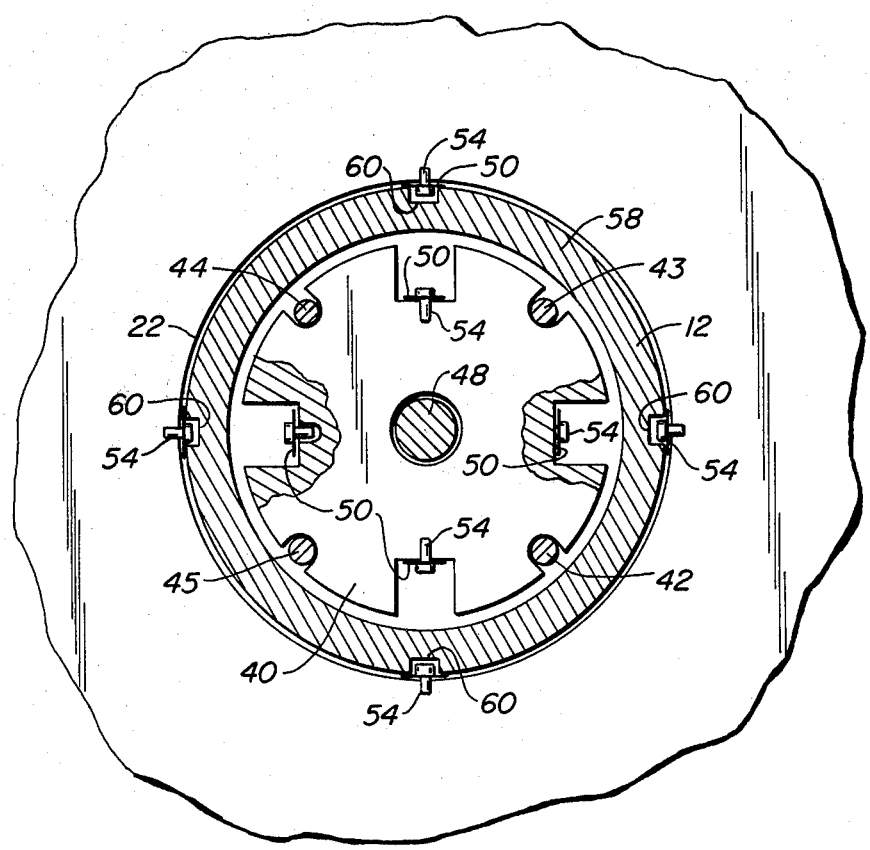
FIG._6.

RIGID DISC HANDLING DEVICE AND METHOD

BACKGROUND OF THE INVENTION

The present invention relates to apparatus for stacking rigid magnetic discs, usually during manufacture, so that the discs do not come into contact with one another.

Rigid magnetic discs are in common use in computer storage and retrieval units. Such discs typically comprise a circular aluminum plate having a central aperture, and both faces of the plate are coated with a magnetic substance to provide a pair of magnetic recording surfaces. Such discs are capable of extremely fine resolution so that a large volume of data can be magnetically stored on a single disc. To preserve such resolution, great care is required in handling the discs so that they do not contact one another or a foreign object. Any such contact significantly degrades the quality of the magnetic coating and ruins the disc.

A variety of relatively complex devices have been developed to handle rigid magnetic discs while they are being manufactured. However, most such devices involve a screw thread arrangement to capture the disc. This type of device is quite sensitive to the size of the central aperture of the disc. This aperture often has a fairly wide tolerance, and such prior devices are sometimes inadequate to prevent the discs from contacting one another, an occurrence which ruins both discs. Moreover, such devices are usually not failsafe and the user of the device can, by mistake, cause the discs to contact one another.

SUMMARY OF THE INVENTION

The present invention provides apparatus for stacking rigid magnetic discs having a central aperture so that the discs do not come into contact with one another. A hollow elongate member has at least two elongate axial recesses terminating at openings at each end of the recesses. The outer surface of the elongate member has dimensions slightly less than the inner dimensions of the central apertures of the discs. Endless loops are mounted so that the loops traverse the respective recesses and return within the elongate member. Each loop has a plurality of equally spaced nibs projecting outwardly beyond the outer surface of the elongate member. A drive element is located within the elongate member and is attached to each of the loops. The drive member is moved axially within the elongate member to move the loops in unison and thereby allow serial loading and unloading of the discs on sequential nibs.

It is preferred that the present invention employ a sensing system which automatically moves the loops during loading and unloading so that the discs will not accidentally contact one another. A switch is provided for placing the apparatus in a loading mode or in an unloading mode. A first position sensor senses the presence or absence of a disc at one end of the elongate member in contact with the initial exposed nibs of the loops. In the loading mode, the sensor automatically moves the drive element upon sensing presence of a disc so that the loops are in position to receive a new disc. The newly loaded disc will thus be spaced from those already loaded. Correspondingly, in the unloading mode, the sensor actuates the drive element when it senses absence of the disc to automatically expose the next disc for unloading.

The present invention provides a simple and convenient mechanism for storing a large number of rigid magnetic discs. The discs themselves are spaced so that they will not contact one another and there is very little chance of damage to the discs. Moreover, using the sensing system of the present invention, the user is generally prevented from accidentally allowing the discs to contact one another. Also, the present invention readily lends itself to automation so that user errors can be avoided entirely.

The novel features which are characteristic of the invention, as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is an elevation, partially cutaway view of the preferred embodiment of the present invention;

FIG. 2 is a sectional plan view taken along lines 2—2 of FIG. 1;

FIGS. 3A and 3B are greatly enlarged fragmentary sectional views of the operation of the sensor system employed in the embodiment of FIG. 1;

FIG. 4 is a fragmentary perspective view of the chain used in the first embodiment;

FIG. 5 is a fragmentary perspective view of the belt used in a second embodiment of the invention; and FIG. 6 is a section view of the second embodiment.

DESCRIPTION OF THE PREFERRED EMBODIMENTS

A first preferred embodiment 10 of the rigid magnetic disc stacking device of the present invention is illustrated primarily by reference to FIGS. 1 and 2 in combination. A hollow cylindrical member 12 is vertically mounted by screws 13, 14 on a platform 16. The outer diameter of cylinder 12 is slightly less than the inner diameter of the central apertures of rigid magnetic discs 18 so that the discs can be slipped over the cylinder.

Four orthogonally disposed axial recesses 20-23 are provided on the outer surface of cylinder 12. As is evident from viewing FIG. 2, each recess 20-23 has a generally "T" shaped cross section with the wide portion of the recess closest to the surface of cylinder 12. Openings are provided in cylinder 12 at each end of each recess 20-23, such as openings 24, 25 at the ends of recess 20 and openings 26, 27 at the ends of recess 22.

A pulley is mounted in cylinder 12 at each opening, such as pulleys 28, 29 in openings 24, 25 respectively. Endless chains 30-33 circumscribe each pair of pulleys associated with a single recess. Each chain such as chain 30 includes a central continuous member 34 (FIG. 4) and a plurality of equally spaced nib structures, each including four orthogonally disposed nibs such as 36-39. Each chain 30-33 traverses its associated recess 20-23 and returns within hollow cylinder 12. Three of the nibs 37-39 of each nib structure 34 rest within the associated "T" shaped recess so that the fourth nib 36 projects outwardly beyond the surface of cylinder 12.

A drive nut 40 is located within cylinder 12. Drive nut 40 engages vertical rods 42-45 so that the drive nut is nonrotatable. Drive nut 40 includes a series of staggered recesses which engage each chain 30–33 to connect the chains to the drive nut.

Drive nut 40 is provided with a central threaded aperture 46 engaged by a lead screw 48. Lead screw 48 is mounted on bearings 50–52 so that the lead screw is freely rotatable. A motor 54 beneath platform 16 has a drive pulley 56 connected to pulley 58 on lead screw 48 by belt 60 so that the motor can be used to rotate the lead screw. Rotation of lead screw 48 causes drive nut 46 to move axially within cylinder 12, moving chains 30–33 in unison.

A first position sensor 62 is located in the surface of cylinder 12, and is adapted to sense the presence or absence of a magnetic disc 18 over the sensor. First position sensor 62 is located so that it determines the presence or absence of a magnetic disc 18 in contact with the initial exposed nibs of each chain, such as nibs 63, 64 of chains 30, 32. A second position sensor 66 is located beneath first position sensor 62 and determines the presence or absence of a disc on nibs such as 67, 68 on chains 30, 32, one step away from the initially exposed nibs 63, 64. Sensors 62, 66 may be of the type sold under the trademark "MICRO SCAN," S27 Series by Scan-A-Matic Corporation of Elbridge, N.Y.

A toggle switch 70 is located on a control unit 72. Toggle switch 70 has positions for "load" and "unload" respectively, and is positioned by the user of the device. Control unit 72 receives input from sensors 62, 66 and controls motor 54.

The operation of the first preferred embodiment of the present invention is illustrated by way of reference to FIGS. 3A and 3B showing the device in its load and unload modes respectively. Load and unload modes are selected by the operator using switch 70.

In the load mode illustrated in FIG. 3A, each time a disc 18 is placed over cylinder 12, it contacts the initially exposed nibs such as 63, 64 of chains 30, 32 (FIG. 1). In this position, the disc immediately overlies first position sensor 62. Control unit 72 receives an indication from sensor 62 that a disc is present overlying the sensor and immediately actuates motor 54. Motor 54 rotates lead screw 48 to move drive nut 40 so that chains 30–33 move downwardly.

Chains 30–33 move in the downward direction until second position sensor 66 senses the presence of a magnetic disc, at which time movement of the chains is terminated. As a result, in the load mode, cylinder 12 is always ready to receive a new disc on the exposed nibs of chains 30–33, and all of the discs already loaded are spaced from one another and will be spaced from the next loaded disc.

FIG. 3B illustrates the first preferred embodiment 10 of the present invention in its unload mode. The operator moves toggle switch 70 to "unload" (FIG. 1). Motor 54 will be immediately actuated to move the chains upwardly so that the uppermost disc 18' is on the initially exposed nibs 63, 64 of the chains overlying first position sensor 62. When uppermost disc 18' is removed, first position sensor 62 senses the absence of the disc, and control unit 72 actuates motor 54 to move the chains upwardly until the next disc overlies first position sensor 62 (second position sensor 66 has no function in the unload mode). Accordingly, each time a disc 18 is removed from cylinder 12, a new disc is exposed automatically for removal.

A second embodiment employing a loop structure other than the chains 30–33 of the first embodiment is illustrated by way of reference to FIGS. 5 and 6. In the second embodiment, each loop structure such as 50 consists of a flexible belt having a plurality of apertures 52 spaced along its length. Pegs such as 54 are inserted in apertures 52 so that a forward portion 56 projects outwardly through the belt. The forward portions 56 of pegs 54 come into two sizes so that alternate pegs will provide minimum interferences with the loading and unloading of the discs while still maintaining adequate spacing.

Referring to FIG. 6, the incorporation of the belts 50 of FIG. 5 into a structure similar to that of the first embodiment is illustrated. The same reference numerals are used in the first embodiment to refer to similar elements. A plurality of slots 60 are formed in cylinder 12. Belts 50 override slots 60 on that the base of the pegs 54 engage the slots. Inside cylinder 12, drive nut 40 engages pegs 54 so that the belts are rigidly fixed to the drive nut.

While preferred embodiments of the present invention have been illustrated in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. Apparatus for stacking rigid magnetic discs having a central aperture, said apparatus comprising:
    a hollow elongate member having external cross sectional dimensions slightly less than the inner dimensions of the central apertures of the discs, the outer surface of said member having at least two elongate axial recesses each terminating at openings at both ends of the recesses;
    at least two endless loops supported proximate the openings so that the chains traverse the respective recesses and return within the elongate member, each said loop having a plurality of spaced nibs projecting outwardly beyond the outer surface of the elongate member;
    a drive element located within the elongate member and attached to each of the loops; and
    means for moving the drive element axially within the elongate member to move the loops in unison and allow serial loading and unloading of magnetic discs on the elongate member on sequential nibs of the loops.

2. The apparatus of claim 1 wherein said moving means comprises means for automatically moving the drive element to move the loops in steps equal to the distance of one interval between nibs, and means for sensing loading or unloading of a disc to actuate said automatic moving means.

3. The apparatus of claim 2 wherein the sensing means comprises means for placing the loops in a loading mode or an unloading mode, and a first position sensor which senses the presence or absence of a disc at one end of the elongate member in contact with the initial exposed nibs of the loops, said first position sensor actuating the automatic moving means in the loading mode upon sensing presence of a disc and actuating the automatic moving means in the unloading mode upon sensing absence of a disc.

4. Apparatus for stacking magnetic discs having a central aperture, said apparatus comprising:
    a hollow elongate member having at least two elongate axial recesses terminating in openings at both ends of the recesses, the outer surface of the elongate member having dimensions slightly less than the inner dimensions of the central apertures of the discs;

a least two endless loops supported proximate the openings so that the loops traverse the respective cutout portions of the elongate member, each said loop having a plurality of spaced nibs projecting outwardly beyond the outer surface of the elongate member;

a drive element located within the elongate member and attached to each of the loops;

a first position sensor which senses the presence or absence of a disc at one end of the elongate member in contact with the initial exposed nibs of the loops;

means for placing the loops in a loading mode or an unloading mode; and means for automatically moving the drive element axially within the elongate member so that the loops move in steps equal to the distance between the nibs on the loops responsively to the first position sensor, said moving means being actuated in the loading mode when the first position sensor senses the presence of a disc, and in the unloading mode when the first position sensor senses the absence of a disc.

5. The apparatus of claim 3 or 4 and additionally comprising a second position sensor sensing the presence of a disc a distance equal to one interval of the nibs on the loops from the position of the first position sensor to determine the distance through which the drive element moves in the loading mode to be in position for loading the next disc.

6. The apparatus of claim 1 or 4 wherein the elongate member is vertical.

7. The apparatus of claim 1 or 4 wherein the elongate member is cylindrical.

8. The apparatus of claim 1 or 4 wherein the loop includes a central continuous member, and a plurality of equally spaced cruciform nib structures each containing four orthogonally disposed nibs.

9. The apparatus of claim 8 wherein the recesses have a "T" shape to conform to three nibs of each structure so that the fourth nib projects outwardly with respect to the elongate member.

10. The apparatus of claim 1 or 4 wherein the loop includes a belt and the nibs comprise a plurality of pegs projecting through the belt.

11. The apparatus of claim 1 or 4 wherein the drive element is nonrotatable and includes a central threaded aperture, and wherein the moving means comprises a lead screw engaging the threaded aperture of the drive element, and means for rotating the lead screw to move the drive element.

12. The apparatus of claim 1 or 4 wherein the elongate member has four orthogonally disposed recesses, and four endless chains traversing the respective recesses.

13. Apparatus for stacking magnetic discs having a round central aperture, said apparatus comprising:

a hollow vertical cylindrical member having four orthogonally disposed elongate axial recesses with a "T" shaped cross-section terminating in openings at both ends of the recesses, the outer surface of the cylindrical member having a diameter slightly less than the diameter of the central apertures of the discs;

four sets of paired pulleys located at the respective openings of the respective recesses;

four endless chains mounted on the pulleys so that the chains traverse the respective recesses and return within the cylindrical member, each chain including a central continuous member and a plurality of equally spaced cruciform nib structures each containing four orthogonally disposed nibs so that three of the nibs of each nib structure ride in the associated recess and orient the chain so that the fourth nib of each nib structure projects outwardly beyond the outer surface of the cylindrical member;

a nonrotatable drive nut located within the cylindrical member and attached to each of the chains;

a lead screw engaging the drive nut so that rotation of the lead screw moves the drive nut axially within the cylindrical member to move the chains in unison;

means for placing the chains in a loading mode or an unloading mode;

a first position sensor which senses the presence or absence of a disc on one end of the cylindrical member in contact with the initial exposed nibs of the chains; and means for rotating the lead screw to move the chains a distance equal to one interval of the nibs on the chain when the sensor senses the presence of a disc in the loading mode, and when the sensor senses absence of a disc in the unloading mode, so that discs can be loaded or unloaded by placing discs on or taking discs off the cylindrical member, and spacing is automatically maintained between discs so that their surfaces are not damaged.

14. A method for stacking rigid magnetic discs having central apertures comprising the steps of:

loading the discs by sequentially placing the discs over an elongate member into contact with the initial exposed projecting nibs of at least two endless loops axially disposed at the surface of the elongate member, sensing the presence of each disc in contact with the initially exposed nibs, and automatically moving the loops in unison a distance equal to the spacing between nibs upon sensing the presence of each disc so that the discs are spaced from one another along the elongate member by the loops; and unloading the discs by sequentially removing the discs in contact with the initial exposed projecting nibs of the loops, sensing the removal of each disc in contact with the initially exposed nibs, and automatically moving the loops in unison a distance equal to the spacing between nibs upon sensing the absence of each disc to place the next disc in position to be removed.

15. The method of claim 14 and additionally comprising the steps of sensing the presence of a disc in a second position a distance equal to the spacing between nibs from the position of a disc in contact with the initial exposed projecting nibs of the loops, and in the loading step, terminating the automatic moving step when the presence of a disc is sensed in the second position.

* * * * *

UNITED STATES PATENT AND TRADEMARK OFFICE
CERTIFICATE OF CORRECTION

PATENT NO. : 4,290,734
DATED : September 22, 1981
INVENTOR(S) : Abraham J. Van Breen It is certified that error appears in the above-identified patent and that said Letters Patent are hereby corrected as shown below:

In claim 1, line 36 change "chains" to --loops--.

Signed and Sealed this

Ninth Day of February 1982

[SEAL]

Attest:

Attesting Officer

GERALD J. MOSSINGHOFF
Commissioner of Patents and Trademarks